Patented June 22, 1943

2,322,320

UNITED STATES PATENT OFFICE 2,322,320

YEAST PROPAGATION

Alfred S. Schultz and Lawrence Atkin, Bronx, and Charles N. Frey, Scarsdale, N. Y., assignors to Standard Brands Incorporated, New York, N. Y., a corporation of Delaware No Drawing. Application March 28, 1939, Serial No. 264,584

14 Claims. (Cl. 195—82)

The invention relates to the propagation of yeast, and to a suitable wort therefor. More particularly, it is concerned with a method for the production of a yeast suitable for baking, and to a synthetic wort in which the yeast may be grown, and includes correlated improvements and discoveries whereby the propagation of yeast may be enhanced.

An object of the present invention is the provision of a method whereby the growth of various yeasts may be augmented and the yield increased.

A further object of the invention is to provide a method for the production of yeast in a synthetic wort or medium whereby increased yields of yeast having good color, baking and keeping qualities may be obtained.

An additional object of the invention is the provision of a method in which the content of growth promoting substances or factors in a wort is augmented by the addition of vitamin $B_6$.

Another object of the invention is the provision of a method for the propagation of yeast in a pure synthetic solution or wort containing carbohydrate material, salts and growth promoting substances, including crystalline vitamin $B_6$.

Other objects of the invention will in part be obvious and will in part appear hereinafter.

The invention accordingly comprises the several steps and the relation of one or more of such steps with respect to each of the others, and the wort possessing the features, properties, and the relation of constituents, which are exemplified in the following detailed disclosure, and the scope of the invention will be indicated in the claims.

In the practice of the invention propagation or growth of a yeast may be effected in a wort or medium which may be synthetic or deficient in one or more growth promoting factors by adding to a medium of this character such growth promoting factors to establish therein conditions which will lead to a full utilization of the carbohydrate and nutrient materials. We have found that when yeasts of certain types or strains are thus propagated, there is a full growth within the synthetic medium, or wort. Thus, if a wort is supplemented by the addition thereto of pure vitamin $B_6$, the yield of Fleischmann 189 yeast is increased. Hence, the introduction of vitamin $B_6$ as an additional growth promoting factor in the wort is of marked advantage for the obtainment of a high yield and effective utilization of the wort materials in the growing of this yeast. A full growth of the type 189 yeast is accomplished only when the four growth promoting factors mentioned below are used in connection with pure vitamin $B_6$.

The four factors may be designated as I, which is believed to be inositol; $II_A$, considered to be beta alanine; $II_B$, of unknown composition and vitamin $B_1$. The use of factor $II_A$, or beta alanine, may be attended by a partial substitution thereof by l-leucine and iso-leucine.

Factor $II_B$ may be produced by an extraction of cane distillery slop with butyl alcohol, methyl isobutyl ketone, or ethyl ether at a pH which is acid to Congo red. The preparation may also be brought about by concentrating molasses slop to 40° Balling and precipitating salts by the addition of alcohol in an amount of about 80%. The alcohol is then evaporated; the residue taken up with water, and an activated carbon introduced thereinto at a pH acid to Congo red. The activated carbon absorbs the factor $II_B$ and this factor may be separated therefrom by elutriation with alcohol. Following distillation of the alcohol, the concentrated $II_B$ may be extracted with ethyl ether or methyl isobutyl ketone and the $II_B$ obtained therefrom by washing with water.

As a wort there may be employed a synthetic medium containing pure ingredients. Thus, pure carbohydrate, as cane sugar or dextrose; nturient compounds, as ammonium salts; factor I, or inositol; factor $II_A$, or beta alanine; factor $II_B$; and vitamin $B_6$. In addition, the wort may include synthetic $B_1$. A wort so prepared may be inoculated with yeast, for example, about 20% of seed yeast, aeration initiated, and propagation carried through with continued aeration with preferably a zulaufing of additional wort containing carbohydrate and nutrient salt materials. Differing types of molasses may vary in their $B_6$ and/or $B_1$ content and the invention may be applied to the correction of such deficiencies.

As an illustrative embodiment of a manner in which the invention may be practiced, the following examples are presented.

*Example I*

A wort may be prepared as a solution having a volume of 30 ml. and containing yeast nutrient and buffer salts in an amount of 0.439 gram, chemically pure dextrose 2.0 gram, and a yeast, moist weight, 0.001 gram. The nutrient salt mixture may contain one or more of the following compounds—potassium dihydrogen phosphate, potassium chloride, calcium chloride, ammonium sulfate, magnesium sulfate, potassium citrate, citric acid, ferric chloride and magnesium sulfate. This mixture is utilized as a control medium or wort and when rocked for 24 hours at 30° C., the crop of yeast obtained was about 15 (the crop × 4.54 gives the mg. of moist yeast). To a wort such as above described there were then added growth promoting factors or supplements, as follows:

|   | Grams |
|---|---|
| I (inositol) | 0.001 |
| II$_A$ (beta alanine) | 0.000005 |
| II$_B$ | About 0.00013 |

To this wort there were also added small amounts of vitamin B$_6$ alone and in conjunction with synthetic vitamin B$_1$. The results obtained at the conclusion of 24 hours utilizing Fleischmann 189 yeast as seed were as follows:

| Additional supplement | Crop |
|---|---|
| None | 15 |
| B$_6$ (0.001 mg.) | 40 |
| B$_6$ (0.005 mg.) | 120 |
| B$_6$ (0.010 mg.) | 150 |
| B$_6$ (0.100 mg.) | 170 |
| B$_1$ (0.010 mg.) | 120 |
| B$_1$ (0.010 mg.)+B$_6$ (0.002 mg.) | 170 |
| B$_1$ (0.010 mg.)+B$_6$ (0.004 mg.) | 185 |
| B$_1$ (0.010 mg.)+B$_6$ (0.006 mg.) | 195 |

The results obtained demonstrated that vitamin B$_6$ has a distinct influence upon the growth characteristics or propagation of this yeast inasmuch as $\tfrac{1}{10}$ of a milligram in the example increases it about twelve fold. It will be observed also that the influence is exerted not only when the vitamin B$_6$ in pure form is used alone, but also when it is included along with synthetic vitamin B$_1$.

*Example II*

A base or control wort is prepared with the additions as given in Example I and in such wort and under like conditions the influence of vitamin B$_6$ upon the growth of a Gebruder Mayer type yeast was shown as follows:

| Additional supplement | Crop |
|---|---|
| None | 210 |
| B$_6$ (0.100 mg.) | 210 |
| B$_1$ (0.010 mg.) | 120 |
| B$_1$ (0.010 mg.)+B$_6$ (0.050 mg.) | 200 |

The effect of vitamin B$_6$ upon the Gebruder Mayer type yeast is shown to be other than that upon Fleischmann 189 yeast. Whereas the propagation or growth of the 189 yeast was materially augmented such was not the case with the Gebruder Mayer yeast. It is shown, however, that the vitamin B$_6$ is of distinct utility in connection with a Gebruder Mayer yeast inasmuch as the inhibitory effect of vitamin B$_1$ was substantially wholly obviated by the presence of vitamin B$_6$. Hence, the influence of vitamin B$_6$ in worts seeded with Fleischmann 189 yeast and a Gebruder Mayer yeast is material. In both cases the growth is decidedly increased, and this is evidenced particularly by an increased yield with a 189 type yeast and an overcoming of inhibition by vitamin B$_1$ with a consequent attending increase in yield with a Gebruder Mayer yeast.

*Example III*

A base wort containing dextrose, yeast nourishing salts and buffer salts to neutralize against excessive acidity may be prepared as in Example I, and such a wort utilized in showing the effect of vitamin B$_6$ alone and in conjunction with factor II$_B$ and synthetic vitamin B$_1$. The base wort also contains factors I and II$_A$ in excess. A tabulation of the results obtained follows:

| Yeast  plus | Crop |
|---|---|
| GM | 40 |
| GM+II$_B$ | 210 |
| GM+B$_6$ (50 gamma) | 40 |
| GM+II$_B$+B$_1$ (10 gamma) | 120 |
| GM+II$_B$+B$_6$ (50 gamma)+B$_1$ (10 gamma) | 200 |
| GM+II$_B$+B$_6$ (50 gamma) | 200 |
| 189+II$_B$ | 15 |
| 189+II$_B$+B$_1$ (10 gamma) | 100 |
| 189+II$_B$+B$_6$ (50 gamma)+B$_1$ (10 gamma) | 170 |
| 189+II$_B$+B$_6$ (50 gamma) | 150 |

That vitamin B$_6$ overcomes the inhibitory action of vitamin B$_1$ upon a Gebruder Mayer yeast and markedly augments the yield of 189 yeast is here further shown.

We have found also that the effect of vitamin B$_6$ upon the growth characteristics of the 189 yeast may be availed of as a means for determining the vitamin B$_6$ content of various materials. If a material believed to contain vitamin B$_6$ is introduced into a wort which is then seeded with 189 yeast, the increase in yield will be indicative of the amount of vitamin B$_6$ in the material. The comparison is made with like seedings of the 189 yeast in the base wort, i. e., without any addition of a material containing vitamin B$_6$.

We have shown the applicability of such procedure by determinations upon a number of yeasts. These substances were made slightly acid with respect to Congo red, and then heated under pressure for about twenty minutes. Following heating, the mass was made up to 100 milliliters and the determination made with an aliquot of the diluted mass. Results, as follows were obtained—two samples of Gebruder Mayer yeast gave crops of 125 and 150 respectively, and the vitamin B$_6$ content calculated as gammas per gram dry weight was 40 and 35. Another yeast similarly tested gave a vitamin B$_6$ content of 25 gamma per gram dry weight. Accordingly, there is provided a ready and relatively accurate method for the determination of the B$_6$ content of materials.

By way of summation it may be mentioned that the inclusion of vitamin B$_6$ in a wort improves the growth of Fleischmann 189 yeast. It also improves the growth of Gebruder Mayer yeast when vitamin B$_1$ is present. It is indicated further that vitamin B$_6$ would enable certain types of yeast to synthesize vitamin B$_1$ with readiness, and that it would be an important factor in the improvement in the baking strength of yeasts.

Furthermore, in place of or in conjunction with synthetic vitamin B$_1$ a pyrimidine, especially an amino pyrimidine and specifically 2-methyl-5-ethoxy methyl-6-amino-pyrimidine, alone and in conjunction with a thiazole, may be included in the wort, with an enhancement in the growth characteristics of the yeast. The thiazole more particularly may be 4-methyl-5-beta hydroxy ethyl thiazole, and the amount introduced may be about 3000 gamma of either or both the pyrimidine and thiazole. It will thus be noted that vitamin B$_6$, especially in pure form, is of distinctive advantage in the growing of a yeast, and that the invention consequently provides a ready means for controlling the growth of various types of yeast in synthetic media and in worts which have a deficiency of growth promoting factors.

This application is a continuation-in-part of our copending application Serial No. 141,858, filed May 10, 1937.

It will be understood that the term "a yeast" in the subjoined claims refers to Fleischmann 189 yeast and a Gebruder Mayer yeast. The Fleischmann 189 yeast is characterized by being a Saccharomyces cerevisiae yeast of a distiller's type, of high baking strength and high protein and invertase content, having good keeping qualities and occasioning rapid fermentation of dextrose, sucrose and maltose.

Since certain changes in carrying out the above process, and certain modifications in the wort which embody the invention may be made without departing from its scope, it is intended that all matter contained in the above description shall be interposed as illustrative and not in a limiting sense.

Having described our invention, what we claim as new and desire to secure by Letters Patent is:

1. A method for the production of yeast, which comprises propagating a yeast under aeration in a wort containing a yeast assimilable carbohydrate, a yeast nourishing inorganic salt, growth promoting factors inositol, beta alanine, II$_B$ and added vitamin B$_6$.

2. A method for the production of yeast, which comprises propagating a yeast under aeration in a wort containing a yeast assimilable carbohydrate, a yeast nourishing inorganic salt, growth promoting factors inositol, beta alanine, II$_B$, vitamin B$_6$ and synthetic vitamin B$_1$.

3. A method for the production of yeast, which comprises propagating a yeast under aeration in a wort containing a yeast assimilable carbohydrate, a yeast nourishing inorganic salt, inositol, beta alanine, and vitamin B$_6$, all in pure condition, and growth promoting factor II$_B$.

4. A method for the production of yeast, which comprises incorporating growth promoting factors including vitamin B$_6$ in pure form into a wort deficient in such factors in an amount sufficient to make up such deficiency.

5. A method for the production of yeast, which comprises incorporating into a wort deficient in growth promoting factors vitamin B$_6$.

6. A method for the production of yeast, which comprises incorporating into a wort deficient in growth promoting factors pure vitamin B$_6$ and crystalline vitamin B$_1$.

7. A method for the production of yeast, which comprises propagating a yeast under aeration in a wort containing a yeast assimilable carbohydrate, a yeast nourishing inorganic salt, growth promoting factors inositol, beta alanine, II$_B$ and vitamin B$_6$, and a 5 substituted methyl pyrimidine capable of enhancing yeast growth.

8. A method for the production of yeast, which comprises propagating a yeast under aeration in a wort containing a yeast assimilable carbohydrate, a yeast nourishing inorganic salt, growth promoting factors inositol, beta alanine, II$_B$, vitamin B$_6$ and 2-methyl-5-ethoxy-methyl-6-amino pyrimidine.

9. A method for the production of yeast, which comprises propagating a yeast under aeration in a wort containing a yeast assimilable carbohydrate, a yeast nourishing inorganic salt, growth promoting factors inositol, beta alanine, II$_B$, vitamin B$_6$, a 5 substituted methyl pyrimidine and a methyl thiazole, said pyrimidine and thiazole being capable of enhancing yeast growth.

10. A method for the production of yeast, which comprises propagating a yeast under aeration in a wort containing a yeast assimilable carbohydrate, a yeast nourishing inorganic salt, growth promoting factors inositol, beta alanine, II$_B$, vitamin B$_6$, 2-methyl-5-ethoxy-methyl-6-amino pyrimidine and 4-methyl-5-beta-hydroxy-ethyl-thiazole.

11. A wort for the production of a yeast, containing yeast assimilable carbohydrate material, a yeast nourishing salt, vitamin B$_6$ and a 5 substituted methyl pyrimidine capable of enhancing yeast growth.

12. A wort for the production of a yeast, containing yeast assimilable carbohydrate material, a yeast nourishing salt, vitamin B$_6$, a 5 substituted methyl pyrimidine and a methyl thiazole, said pyrimidine and thiazole being capable of enhancing yeast growth.

13. A wort for the production of a yeast, containing yeast assimilable carbohydrate material, a yeast nourishing salt, vitamin B$_6$, and 2-methyl-5-ethoxy-methyl-6-amino-pyrimidine.

14. A wort for the production of a yeast, containing yeast assimilable carbohydrate material, a yeast nourishing salt, vitamin B$_6$, 2-methyl-5-ethoxy-methyl-6-amino-pyrimidine, and 4-methyl-5-beta-hydroxy-ethyl-thiazole.

ALFRED S. SCHULTZ.
LAWRENCE ATKIN.
CHARLES N. FREY.